United States Patent
Ax, Jr. et al.

(10) Patent No.: US 7,417,210 B2
(45) Date of Patent: Aug. 26, 2008

(54) MULTI-SPECTRAL SENSOR SYSTEM AND METHODS

(75) Inventors: George R. Ax, Jr., Arlington, VA (US); Neil Z. Sherman, Fairfax Station, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/479,280

(22) Filed: Jun. 30, 2006

(65) Prior Publication Data

US 2008/0001066 A1    Jan. 3, 2008

(51) Int. Cl.
*G01J 1/20* (2006.01)
*H01L 27/00* (2006.01)
*G02B 21/00* (2006.01)
*G02B 7/28* (2006.01)
*G01B 11/26* (2006.01)

(52) U.S. Cl. .............. 250/201.1; 250/208.1; 359/381; 396/118; 356/141.4

(58) Field of Classification Search .............. 250/208.1, 250/226, 203.6, 203.5, 201.8, 201.1, 201.2, 250/204, 206, 234, 235, 236; 356/326, 228, 356/444, 138, 141.4; 348/272, 294, 340, 348/145, 208.12; 358/42, 41, 505, 514; 359/201, 359/205, 226, 379, 381; 396/116, 118
See application file for complete search history.

(56) References Cited

U.S. PATENT DOCUMENTS

| | | | |
|---|---|---|---|
| 5,610,930 A * | 3/1997 | Macomber et al. ............ | 372/36 |
| 6,747,686 B1 | 6/2004 | Bennett | |
| 6,779,930 B1 * | 8/2004 | Chandan et al. ............... | 385/96 |
| 6,826,358 B2 | 11/2004 | Partynski et al. | |
| 6,831,688 B2 * | 12/2004 | Lareau et al. ............... | 348/272 |
| 7,312,429 B2 * | 12/2007 | Guyer et al. ............. | 250/203.6 |
| 2003/0185549 A1 | 10/2003 | Partynski et al. | |
| 2003/0193589 A1 | 10/2003 | Lareau et al. | |
| 2005/0110873 A1 | 5/2005 | Shigeo | |
| 2007/0057146 A1 * | 3/2007 | Ashley et al. ............ | 250/208.1 |

FOREIGN PATENT DOCUMENTS

JP    2003 032537 A    1/2003

OTHER PUBLICATIONS

Partial European Search Report for corresponding EP 07 01 2172, Completed Oct. 11, 2007 in Munich.

* cited by examiner

*Primary Examiner*—Georgia Y. Epps
*Assistant Examiner*—Don Williams
(74) *Attorney, Agent, or Firm*—Tarolli, Sundheim, Covell & Tummino LLP

(57) ABSTRACT

A multi-spectral sensor system and methods are disclosed. One aspect of the invention comprises a multi-spectral sensor system mountable to a mobile platform. The system may comprise an image capturing system, a first translation stage affixed to the image capturing system and a stationary optics assembly. The system may further comprise a motion controller configured to move the first translation stage and image capturing system across the stationary optics along a traveling direction opposite of a traveling direction of the mobile platform and at substantially the same rate as the mobile platform is moving during a stare operation.

24 Claims, 3 Drawing Sheets

MULTI-SPECTRAL SENSOR SYSTEM AND METHODS

TECHNICAL FIELD

The present invention relates generally to imaging, and more particularly to a multi-spectral sensor system and methods.

BACKGROUND

Hyperspectral and mutispectral imaging systems have been employed for aerial reconnaissance and surveillance applications employing an image capturing array, such as a Focal Plane Array (FPA) of an area array format. Hyperspectral imaging systems refer to those in which radiation at thirty or more discrete wavelengths are imaged. Imagers that image a lesser but plural number of spectral bands are referred to as multispectral imagers. These systems are used in various applications, including Department of Defense airborne and satellite systems and commercial land resource management imaging systems. Typically, these imaging systems are mounted onto a mobile platform and images are captured as the mobile platform is moving past the scene of interest.

In a typical operation, the hyperspectral or multispectral system is moved over the scene of interest either by moving the entire system (i.e., "pushbroom") or by movement of a scan mirror or gimbal at the same rate as the mobile platform is moving. Moving a scan mirror or gimbal at the same rate as the mobile platform mitigates smearing of the captured image, that is, such techniques perform Forward Motion Compensation (FMC). However, both of these FMC methodologies have complex opto-mechanical implementations that in general add size, weight, power, and cost to the airborne payload.

SUMMARY

One aspect of the invention comprises a multi-spectral sensor system mountable to a mobile platform. The system may comprise an image capturing system, a first translation stage affixed to the image capturing system and a stationary optics assembly. The system may further comprise a motion controller configured to move the first translation stage and image capturing system across the stationary optics along a first orthogonal axis to compensate for mobile platform motion during a stare operation.

Another aspect of the system relates to a multi-spectral sensor system mountable to a mobile platform and having an image detector array and a stationary optical assembly. The system may comprise means for moving the image detector array along a first orthogonal axis to compensate for mobile platform motion during a stare operation, and means for controlling the means for the image detector array along a first orthogonal axis to compensate for mobile platform motion during a stare operation.

Another aspect of the invention relates to a methodology for capturing an image from a multi-spectral sensor system mounted to a mobile platform. The multi-spectral sensor system may have an image detector array having a plurality of spectral regions defined by respective spectral filters. The methodology may comprise scanning a first spectral region of the image detector array over a central axis of a stationary optical assembly from a first starting stare position to a first ending stare position and capturing a first set of pixel values from the image detector array, storing the first set of captured pixel values from the image detector array and moving the image detector array to a second starting stare position. The methodology may further comprise scanning a second spectral region of the image detector array over a central axis of a stationary optical assembly from the second starting stare position to a second ending stare position and capturing a second set of pixel values from the image detector array.

DETAILED DESCRIPTION

Figure 1:
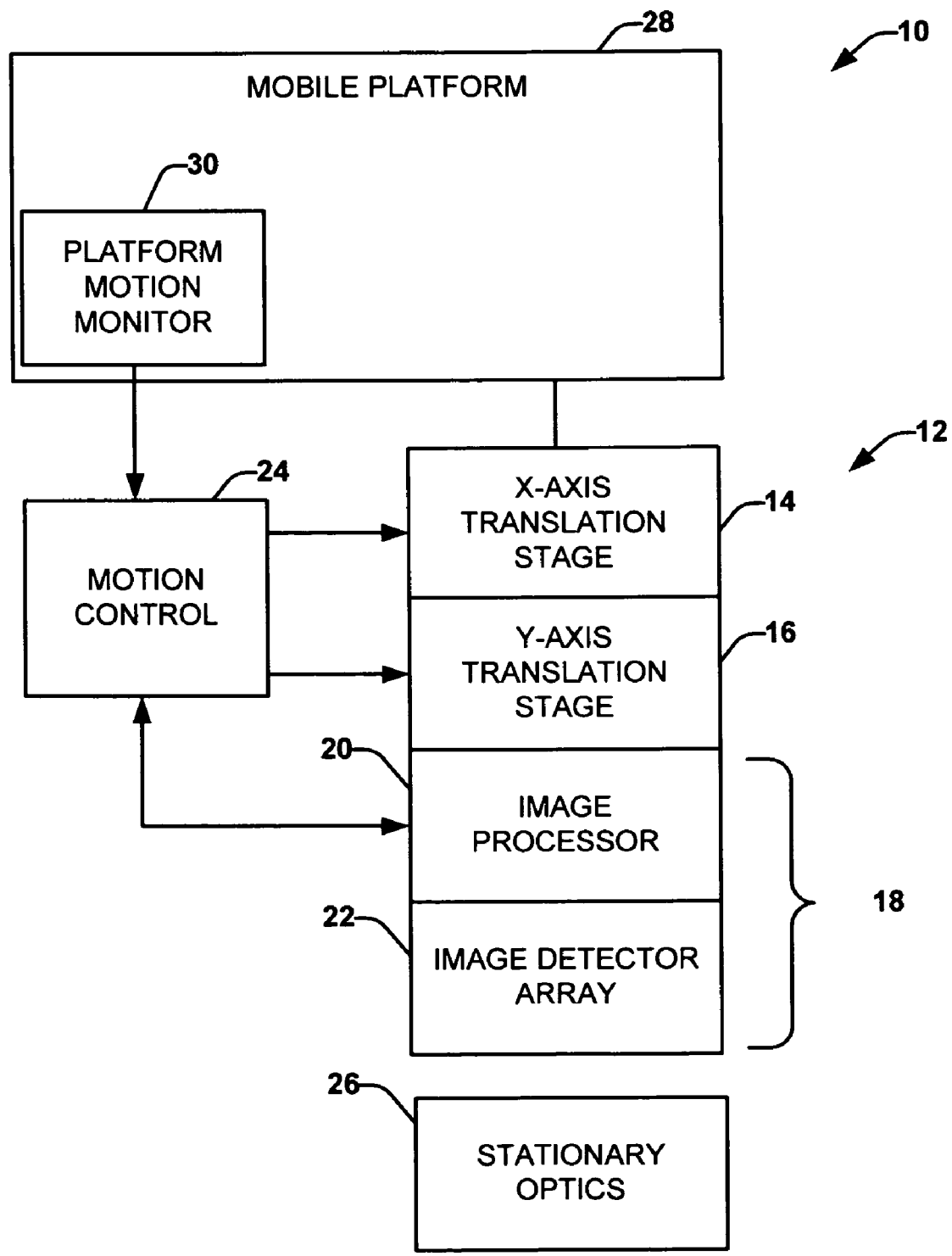
FIG. 1 illustrates a block diagram of a reconnaissance or surveillance system in accordance with an aspect of the present invention.

FIG. 1 illustrates a block diagram of a reconnaissance or surveillance system 10 in accordance with an aspect of the present invention. The system 10 includes a multi-spectral sensor system 12 mounted to a mobile platform 28. The platform 28 may be an aircraft, helicopter, dirigible (inflatable), ground, or surface maritime vehicle, and may be either manned or unmanned. The multi-spectral sensor system 12 includes a motion control 24 that controls the scan motion of an image capturing system 18 across a stationary optics assembly 26 via a Y-axis translation stage 16 and an X-axis translation stage 14. The stationary optics assembly can be, for example, a simple lens. The direction of travel of the Y-axis translation stage 16, the direction of travel of the X-axis translation stage 14, and the optical axis of the stationary optics 26 form three orthogonal axes. The multi-spectral sensor system 12 is positioned on the mobile platform 10 in a manner that allows the stationary optics 26 and image capturing system 18 to view the ground at or near nadir, while allowing the Y-axis translation stage 16 and the X-axis translation stage 14 to compensate platform motions projected to the focal plane of the image detector array 22 in the Y-direction and X-direction, respectively.

The image capture system 18 includes an image detector array 22 and an image processor 20. The image detector array 22, the image processor 20, the Y-axis translation stage 16 and the X-axis translation stage 14 form an image capturing/stage assembly all of which moves during an image scan and return operation, which can be referred to as a stare operation (image capturing operation) and step operation (return for next image capturing operation). The image detector array 22 senses the image, which is captured during a stare operation by the image processor 20. The image processor 20 can then provide image information to a remote location, via one or more data ports (not shown). The image processor 20 can include other functionality for enhancing and otherwise processing the imagery if this is desired. It is to be appreciated that a portion of the image processor 20 could be remotely located from the image capturing system 18.

For forward motion compensation, the image capturing system 18 is moved by the motion control 24 and Y-axis translation stage 16 across the stationary optics 26 at a rate directly corresponding to the image motion induced by forward movement in the direction of the mobile platform heading. The image motion rate can be inferred from a platform position, velocity and orientation (PVO) monitor 30 residing on the mobile platform. The PVO monitor may include an altimeter to measure platform height above ground level (AGL), or alternatively, may rely on a height above sea level (e.g., using GPS) and terrain knowledge to infer height AGL. The image motion rate induced by aircraft forward motion can be inferred from readings from an inertial navigation system (INS) on the aircraft combined with the measurement or estimation of height AGL. The image motion rates induced by platform rotational (inertial) rates can be inferred from readings from an inertial measurement unit (IMU), which may be contained within the INS.

It is to be appreciated that the stages do not move at the same rate as the platform, but move at a substantially slower rate (e.g., ~100-200 times slower), which is at the same rate as the apparent image motion. For example, the apparent image motion can be computed as the platform (ground) speed divided by the altitude (AGL) times the focal length of the stationary optics 26.

Alternately, the aggregate linear and inertial motion can be directly measured by the imaging capturing system 18 and motion control 24 (e.g., using a correlation algorithm to measure the displacement of features contained within the image). By moving the image detector array 22 commensurate with the image motion, the image is effectively stationary relative to the image detector array 22, thus eliminating smearing due to either/both of detector integration and detector bandwidth limitations (e.g., the thermal time constant of a bolometric type infrared sensor).

The motion control 24 and Y-axis translation stage 16 can also compensate for relative pitch (i.e., pitch in the Y-direction of the image plane), and is configured to repeatedly scan the image detector array 22 across the stationary optics during a stare operation and return to its original position or a new stare starting position in a step operation. The motion control 24 and X-axis translation stage 14 can compensate for relative (image plane) roll in addition to non-zero heading of the mobile platform 28. For example, the motion control 24 and X-axis translation stage 14 can compensate for the crab angle of an aircraft during forward motion compensation. Additionally, the employment of the X-axis translation stage 14 allows for relatively simple and easy alignment of the multi-spectral sensor system 12 without undue regard for its rotational alignment to the platform in the X-Y plane. The Y-axis translation stage 16 and the X-axis translation stage 14 can be, for example, high precision piezoelectric actuators, stepper motors or some other linear actuating device.

In an alternate aspect of the present invention, the X-axis translation stage 14 can be replaced with a rotation ("Theta") stage atop the Y-axis translation stage 16. The rotation stage serves to orient the -axis translation stage 16, the image processor 20, and the image detector array 22 in the direction of the platform heading. Thus, only a single Y-axis translation stage is required to perform forward motion compensation, and secondarily, compensation of platform pitch projected to the image plane. The rotation stage configuration does not allow for compensation of platform roll projected to the image plane. However, it alleviates the accelerations and therefore the power required to drive the X-axis stage in the presence of platform roll or non-zero heading. Additionally, the rotational stage can have very low bandwidth, since the crab angle does not change very rapidly.

The image detector array 22 can be, for example, a focal plane array (FPA) with a plurality of spectral filters arranged on the FPA in blocks to form a plurality of spectral regions. Each spectral region can contain a block of pixels. The plurality of spectral filters can be selected to allow light to pass through at different spectral bands that can vary from the ultra-violet to infra-red bands include both visible and invisible bands. For example, each spectral region contains a unique spectral filter positioned atop the FPA (i.e., between the detector elements and the optic). It is to be appreciated that other detector array types can be employed to detect the image.

In one aspect of the invention, the multi-spectral sensor system is configured to provide time-multiplexed multi-spectral imaging. The following is an example of a time-multiplexed multi-spectral imaging methodology for an image detector array that is divided into a first spectral region and a second spectral region via respective filters. The image capturing/stage assembly can be rapidly shifted from to the first spectral region to the second spectral region, as follows.

The first spectral region of the image detector array 22 is scanned over a central axis of the stationary optics 26, the image is captured by the image detector array 22, and the pixels values are stored in a buffer (not shown) of the image processor 20. The pixels associated with the first spectral region are read out and processed as a first spectral image to form a first strip map. The second spectral region of the image detector array 22 is then scanned over a central axis of the stationary optics, 26 the image is captured by the image detector array 22, and the pixels values are stored in a buffer (not shown) of the image processor 20. The pixels associated with the second spectral region are read out and processed as a second spectral image to form a second strip map. The first and second strip map provides substantially identical perspectives of the imaged scene (e.g., ground swath) but at different spectral wavelengths that can be employed for comparative analysis. It is to be appreciated that this process can be extended to several additional spectral regions subject to the constraints of the bandwidth of the translation stages, the rapidity of image motion, and the required overlap of captured images.

Figure 2:
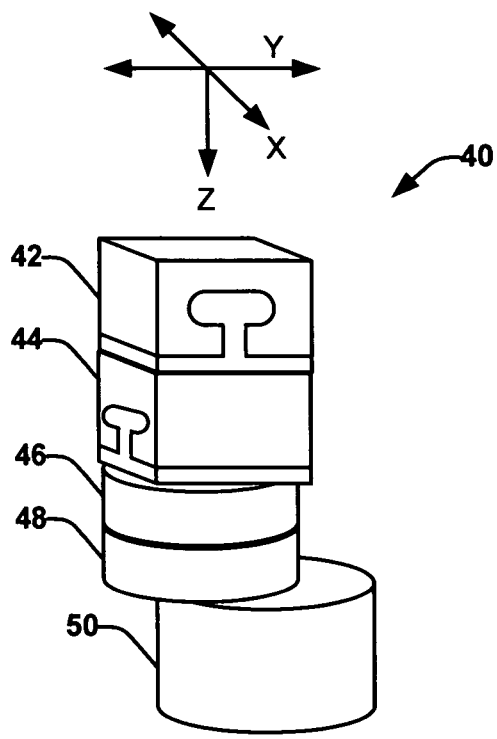
FIG. 2 illustrates translation of an image capturing/stage assembly during a stare operation in accordance with an aspect of the present invention.
Figure 3:
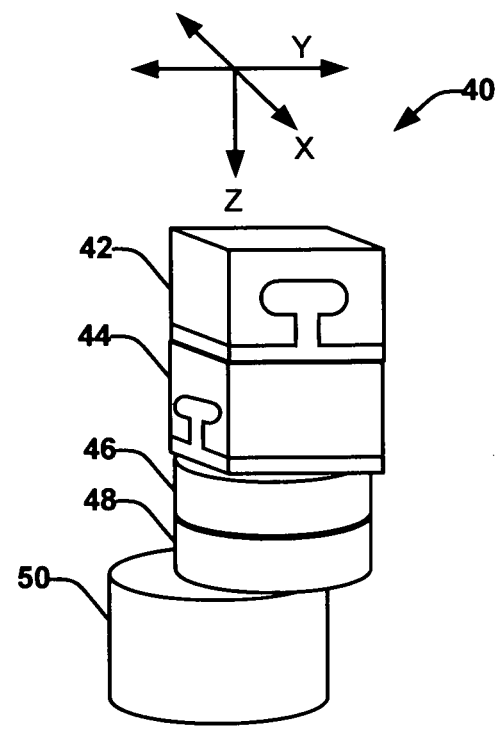
FIG. 3 illustrates translation of an image capturing/stage assembly during a step operation in accordance with an aspect of the present invention.

FIGS. 2-3 illustrate translation of an image capturing/stage assembly 40 in both a stare and step operation in accordance with an aspect of the present invention. The image capturing/stage assembly 40 includes an image detector array 48 (e.g., FPA), an image processor 46 that may be integral to the FPA or that may be separate circuit boards, a Y-axis translation stage 44 and an X-axis translation stage 42. The image capturing/stage assembly 40 is moved across a stationary optics assembly 50 (e.g., lens) during stare and step operations. As illustrated in FIG. 2, the image capturing/stage assembly 40 is scanned over a central axis of the stationary optics assembly 50 along a first orthogonal axis (Y-axis) and at the same rate as the image motion apparent to the FPA. The apparent image motion is a function of the platform ground speed, the height AGL, and the focal length of the optics. During this time, the image detector array 48 is capturing pixels of the image to be processed. During the stare operation, the Y-axis translation stage 44 and an X-axis translation stage 42, which can move the image detector array 48 along a second orthogonal axis (X-axis) that is transverse to the first orthogonal axis, can be employed to compensate for the linear image motion induced by platform pitch and roll, in addition to the platform forward motion at any heading. As illustrated in FIG. 3, the image capturing/stage assembly 48 is scanned back over the central axis of the stationary optics assembly in generally the same direction as the mobile transport is moving during a step operation for performing an additional scan. During this time, the image detector array 48 is not capturing pixels of the image to be processed. The optical axis of the stationary optics 50 from a third orthogonal axis (Z-axis).

Figure 4:
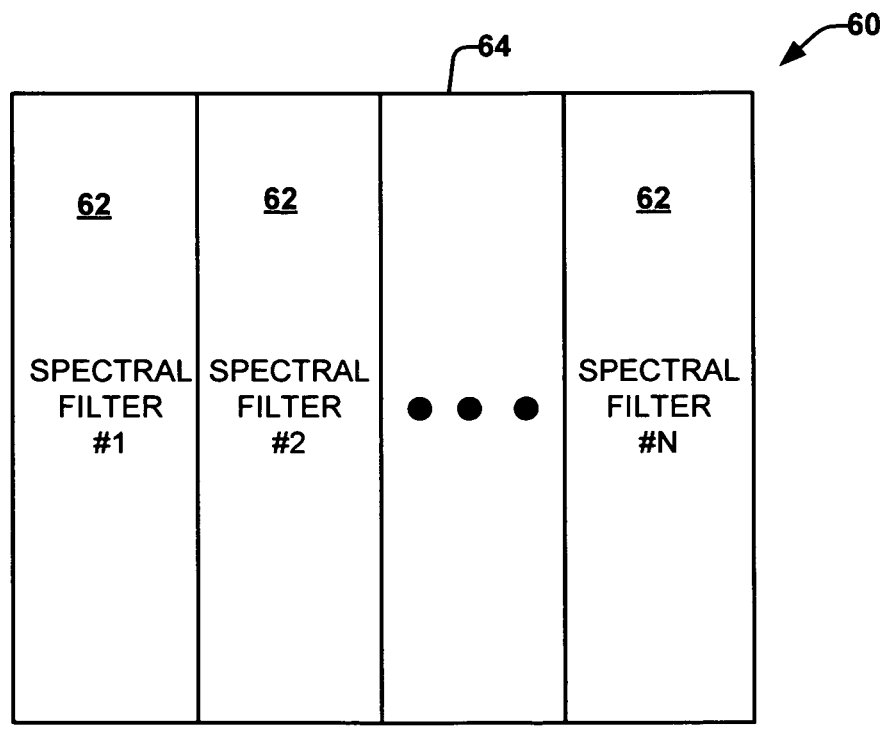
FIG. 4 illustrates a block diagram of an image detector array in accordance with an aspect of the present invention.

FIG. 4 illustrates a block diagram of an image detector array 60 in accordance with an aspect of the present invention. The image detector array 60 assembly includes a plurality of spectral filters (#1-#N) 62 arranged on an FPA 64 in blocks to form a plurality of spectral regions, where N is greater than or equal to two and limited by the constraints of the bandwidth of the translation stages, the rapidity of image motion, and the required overlap of captured images as previously stated. The plurality of spectral filters 62 are selected to allow light to pass through at different spectral bands. It is to be appreciated that the spectral filters 62 need not be affixed to the top of the FPA 64, as long as it is disposed between the FPA 64 and a stationary optics assembly.

Figure 5:
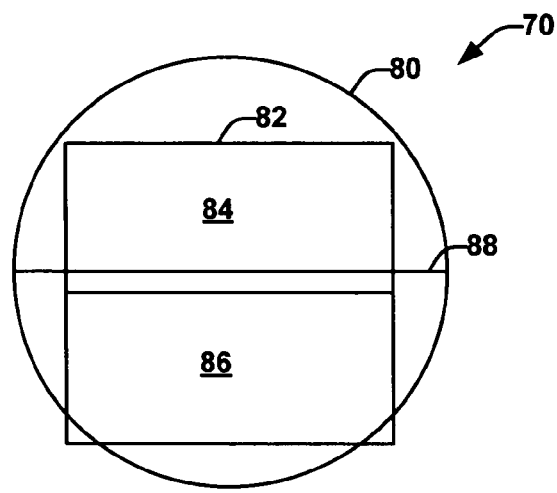
FIG. 5 illustrates a first starting stare position for scanning a first spectral region of the image detector array over a central axis of a stationary optics in accordance with an aspect of the present invention.
Figure 6:
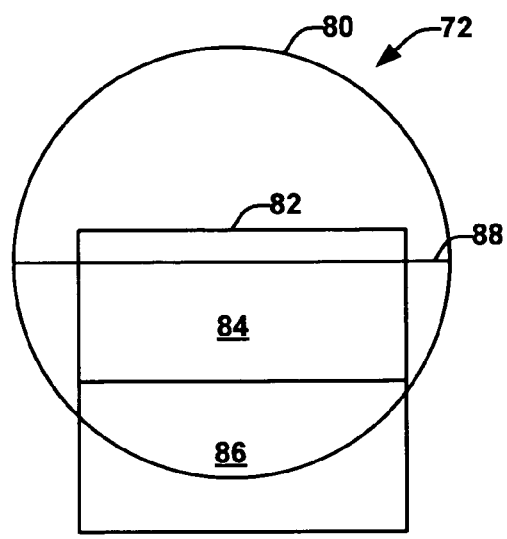
FIG. 6 illustrates a first ending stare position for scanning a first spectral region of the image detector array over a central axis of a stationary optics in accordance with an aspect of the present invention.

FIGS. 5-8 illustrate positions of an image detector array 82 during a time-multiplexed multi-spectral image capturing methodology in accordance with an aspect of the present invention. The image detector array 82 includes a first spectral region 84 and a second spectral region 86 via respective filters, as illustrated in FIG. 4. FIG. 5 illustrates a starting stare position 70 for the first spectral region 84 of the image detector array 82 as a first end portion of the first spectral region 84 is positioned over a central axis 88 of the stationary optics 80. FIG. 6 illustrates an ending stare position 72 for the first spectral region 84 of the image detector array 82 as a second end portion of the first spectral region 84 is positioned over a central axis 88 of the stationary optics 80. The displacement occurring in the position of the image detector array between that indicated in FIG. 5 and that indicated in FIG. 6 is due to the forward motion compensation procedure in accordance with an aspect of the present invention. During the starting stare position 70 and ending stare position 72 for the first spectral region 84, the image is captured by the image detector array 82, and the pixels values are stored in a buffer, as previously discussed. The pixels associated with the first spectral region 84 are read out and processed as a first spectral image with the remaining pixel values being ignored.

Figure 7:
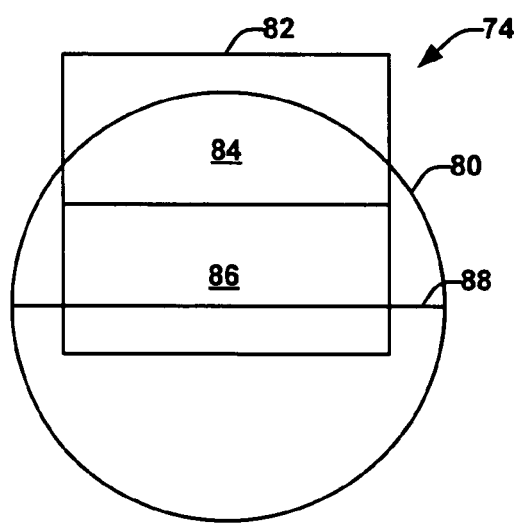
FIG. 7 illustrates a second starting stare position for scanning a second spectral region of the image detector array over a central axis of a stationary optics in accordance with an aspect of the present invention.
Figure 8:
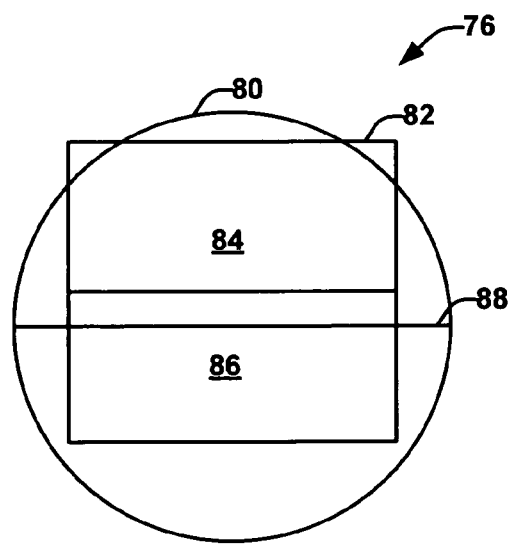
FIG. 8 illustrates a second ending stare position for scanning a second spectral region of the image detector array over a central axis of a stationary optics in accordance with an aspect of the present invention.

A step operation is then performed to move the second spectral region 86 to a starting stare position 74, such that a first end of the second spectral region 86 is positioned over the central axis 88 of the stationary optics 80, as illustrated in FIG. 7. FIG. 8 illustrates an ending stare position 76 for the second spectral region 86 of the image detector array 82 as a second end portion of the second spectral region 86 is positioned over the central axis 88 of the stationary optics 82. The displacement occurring in the position of the image detector array between that indicated in FIG. 7 and that indicated in FIG. 8 is due to the forward motion compensation procedure in accordance with an aspect of the present invention. During the starting stare position 74 and ending stare position 76 for the second spectral region 86, the image is captured by the image detector array 82, and the pixels values are stored in a buffer, as previously discussed. The pixels associated with the second spectral region 86 are read out and processed as a second spectral image with the remaining pixel values being ignored. Another step operation is performed to move the image detector array 82 to the position 70 illustrated in FIG. 5 and repeat the stare and step operation methodology.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A multi-spectral sensor system mountable to a mobile platform, the system comprising:
   an image capturing system;
   a first translation stage affixed to the image capturing system;
   a stationary optics assembly; and
   a motion controller configured to move the first translation stage and image capturing system across the stationary optics along a first orthogonal axis to compensate for mobile platform motion during a stare operation.

2. The system of claim 1, further comprising a second translation stage affixed to the first translation stage, the motion controller being further configured to move the second translation stage and the image capturing system along a second orthogonal axis transverse to the first orthogonal axis to compensate for roll and non-zero headings of the mobile platform during a stare operation.

3. The system of claim 2, wherein the first translation stage and the second translation stage are piezoelectric actuators.

4. The system of claim 1, further comprising a rotational stage affixed to the first translation stage configured to rotate the stationary optics to compensate for roll and non-zero headings of the mobile platform during a stare operation.

5. The system of claim 1, wherein the motion controller is further configured to move the first translation stage to compensate for pitch of the mobile platform during a stare operation.

6. The system of claim 1, wherein the image capturing system comprises an image detector array having a plurality of spectral regions defined by respective spectral filters.

7. The system of claim 6, wherein the motion controller is further configured to sequentially move a respective spectral region of the image detector array across a central axis of the stationary optics during a respective stare operation to capture a respective image to be processed.

8. The system of claim 7, further comprising an image processor that sequentially processes pixel values of a respective spectral region associated with a respective captured image during a respective stare operation.

9. The system of claim 8, wherein the image processor ignores pixel values outside the respective spectral region during processing of the respective spectral region.

10. The system of claim 1, wherein the image capturing system comprises a focal plane array (FPA).

11. A multi-spectral sensor system mountable to a mobile platform and having an image detector array and a stationary optics assembly, the system comprising:
   means for moving the image detector array across the stationary optics along a first orthogonal axis to compensate for mobile platform motion during a stare operation; and means for controlling the means for moving the image detector array across the stationary optics along the first orthogonal axis to compensate for mobile platform motion during a stare operation.

12. The system of claim 11, further comprising means for moving the image detector array along a second orthogonal axis transverse to the first orthogonal axis to compensate for roll and non-zero headings of the mobile platform during a stare operation.

13. The system of claim 11, further comprising means for rotating the image detector array to compensate for roll and non-zero headings of the mobile platform during a stare operation.

14. The system of claim 11, wherein the means for moving the image detector array across the stationary optics along a first orthogonal axis is further configured to compensate for pitch of the mobile platform during a stare operation.

15. The system of claim 11, wherein the image detector array comprises an image detector array having a plurality of spectral regions defined by respective spectral filters.

16. The system of claim 15, wherein the means for controlling is further configured to sequentially move a respective spectral region of the image detector array across a central axis of the stationary optics during a respective stare operation to capture a respective image to be processed.

17. The system of claim 16, further comprising means for sequentially processing pixel values of a respective spectral region associated with a respective captured image during a respective stare operation, wherein the means for processing ignores pixel values outside the respective spectral region during processing of the respective spectral region.

18. A methodology for capturing an image from a multi-spectral sensor system mounted to a mobile platform, the multi-spectral sensor system having an image detector array having a plurality of spectral regions defined by respective spectral filters, the methodology comprising:
scanning a first spectral region of the image detector array over a central axis of a stationary optical assembly from a first starting stare position to a first ending stare position and capturing a first set of pixel values from the image detector array;
storing the first set of captured pixel values from the image detector array;
moving the image detector array to a second starting stare position; and
scanning a second spectral region of the image detector array over the central axis of the stationary optical assembly from the second starting stare position to a second ending stare position and capturing a second set of pixel values from the image detector array.

19. The method of claim 18, further comprising processing a portion of the first set of captured values associated with the first spectral region to form a first strip map and processing a portion of the second set of captured values associated with the second spectral region to form a second strip map.

20. The method of claim 18, wherein the scanning a first spectral region and scanning a second spectral region comprises scanning at a rate along a first orthogonal axis that compensates for mobile platform motion during a stare operation.

21. The method of claim 20, wherein the scanning a first spectral region and scanning a second spectral region further comprises adjusting the scanning rate along the first orthogonal axis to compensate for pitch of the mobile platform.

22. The method of claim 20, wherein the scanning a first spectral region and scanning a second spectral region further comprises moving the image detector array along a second orthogonal axis transverse to the first orthogonal axis to compensate for roll and non-zero headings of the mobile platform.

23. The method of claim 20, wherein the scanning a first spectral region and scanning a second spectral region further comprises rotating the image detector array to compensate for roll and non-zero headings of the mobile platform.

24. The method of claim 18, further comprising sequentially scanning additional spectral regions of the image detector array over a central axis of a stationary optical assembly from a starting stare position to an ending stare position and capturing a set of pixel values from the image detector array associated with a respective scan.

* * * * *